US012417376B2

(12) United States Patent
Chen et al.

(10) Patent No.: US 12,417,376 B2
(45) Date of Patent: Sep. 16, 2025

(54) MACHINE-LEARNED NEURAL NETWORK ARCHITECTURES FOR INCREMENTAL LIFT PREDICTIONS

(71) Applicant: Maplebear Inc., San Francisco, CA (US)

(72) Inventors: Zhenbang Chen, Jersey City, NJ (US); Jingying Zhou, San Francisco, CA (US); Peng Qi, Menlo Park, CA (US)

(73) Assignee: Maplebear Inc., San Francisco, CA (US)

(*) Notice: Subject to any disclaimer, the term of this patent is extended or adjusted under 35 U.S.C. 154(b) by 709 days.

(21) Appl. No.: 17/855,366

(22) Filed: Jun. 30, 2022

(65) Prior Publication Data

US 2024/0005132 A1 Jan. 4, 2024

(51) Int. Cl.
*G06N 3/048* (2023.01)
*G06N 3/08* (2023.01)
*G06Q 30/0601* (2023.01)

(52) U.S. Cl.
CPC ............... *G06N 3/048* (2023.01); *G06N 3/08* (2013.01); *G06Q 30/0631* (2013.01)

(58) Field of Classification Search
CPC ............................. G06N 3/08; G06Q 30/0631
USPC ............................................................ 706/21
See application file for complete search history.

(56) References Cited

U.S. PATENT DOCUMENTS 10,402,836 B2 9/2019 Kukade et al.
10,699,191 B2 6/2020 Goodfellow et al.
2015/0324690 A1 11/2015 Chilimbi et al.
2021/0303967 A1* 9/2021 Bender .................... G06N 3/08
2021/0334656 A1 10/2021 Sjögren et al.

(Continued)

FOREIGN PATENT DOCUMENTS

WO WO 2019/190992 A1 10/2019

OTHER PUBLICATIONS

Palacios et al., "Contextual Classification Using Self-Supervised Auxiliary Models for Deep Neural Networks", Jan. 10, 2021, IEEE, 2020 25th International Conference on Pattern Recognition (ICPR) (2021, pp. 8937-8944) (Year: 2021).*

(Continued)

*Primary Examiner* — Kambiz Zand
(74) *Attorney, Agent, or Firm* — Fenwick & West LLP

(57) ABSTRACT

An online system trains a machine-learned lift prediction model configured as a neural network. The machine-learned lift prediction model can be used during the inference process to determine lift predictions for users and items associated with the online system. By configuring the lift prediction model as a neural network, the lift prediction model can capture and process information from users and items in various formats and more flexibly model users and items compared to existing methods. Moreover, the lift prediction model includes at least a first portion for generating control predictions and a second portion for generating treatment predictions, where the first portion and the second portion share a subset of parameters. The shared subset of parameters can capture information important for generating both control and treatment predictions even when the training data for a control group of users might be significantly smaller than that of the treatment group.

17 Claims, 10 Drawing Sheets

Online System
110
Prediction System
130
Network
120
Client Device
116A
Client Device
116B
100

(56) References Cited

U.S. PATENT DOCUMENTS

2021/0358032 A1* 11/2021 Cella .................. G06F 16/2379
2022/0398605 A1 12/2022 Chen et al.

OTHER PUBLICATIONS

Chollet, F. "The Functional API," Keras, Apr. 12, 2020, pp. 1-19, Retrieved from the internet <URL:https://keras.io/guides/function-alapi/.>.

* cited by examiner

MACHINE-LEARNED NEURAL NETWORK ARCHITECTURES FOR INCREMENTAL LIFT PREDICTIONS

BACKGROUND

Online systems, such as online concierge systems, e-commerce systems, and social networking systems, present content items to users typically to increase the likelihood that users will perform desired actions associated with the content items. For example, an online concierge system may receive orders from one or more users, where an order specifies a list of goods or products to be delivered to the user. The online concierge system may present content items for a product to a user to induce the user to convert and purchase the product described in the content item in response to viewing the content item.

One important metric in evaluating the performance of content items is incremental lift. Specifically, lift evaluates the effectiveness of a given content item by measuring the increase in desired actions of users that is attributable to the presentation of content items. In other words, lift indicates the increase in desired actions of users in response to being presented with content items compared to when users would have been presented with the content items. It is advantageous to predict incremental lift for users and products. However, this is inherently a difficult problem because users cannot be presented and not presented with content items at the same time. Moreover, conventional models for predicting lift have limited capacity to process large amounts of data. In addition, conventional models involve generating a training dataset that divides a group of users into a treatment group and a control group such that only the treatment group is presented with a content item. However, since the number of users in the control group are typically significantly different (e.g., smaller or larger) than the number of users in the treatment group, this can lead to inaccurate and biased results.

SUMMARY

An online system trains a machine-learned lift prediction model configured as a neural network. The machine-learned lift prediction model can be used during the inference process to determine lift predictions for users and products associated with the online system. In one instance, content items describing items (e.g., products, videos, images) are presented to users with lift predictions equal to or above a predetermined threshold.

Specifically, by configuring the lift prediction model as a neural network, the lift prediction model can capture and process information from users and items in various formats and more flexibly model users and items compared to existing methods. Moreover, in one embodiment, the lift prediction model includes at least a first portion for generating control predictions and a second portion for generating treatment predictions, where the first portion and the second portion share a subset of parameters. The shared subset of parameters can capture information important for generating both control and treatment predictions even when the training data for a control group of users might be significantly smaller than that of the treatment group. On the other hand, the unshared subset of parameters can be used to differentiate control predictions from treatment predictions, which may be important for determining the lift metric.

In one embodiment, an architecture of the lift prediction model is configured as a neural network including a first portion and a second portion, the first portion and the second portion sharing a subset of parameters. The online system obtains a set of features describing a user and an item associated with an online system. The online system accesses a machine-learned neural network model with a set of trained parameters, the neural network model including the first portion and the second portion. The online system generates a lift prediction for the user and the content item by applying the neural network model, where the lift prediction indicates an increase in likelihood the user will perform a desired action on the item when presented with a content item relative to when the user would have been but is not presented with the content item. The online system may present the content item to the user for viewing if the lift prediction is equal to or above a predetermined threshold.

Specifically, to generate the lift prediction, the first portion of the neural network model is applied to the set of features to generate a control output, and the second portion of the neural network model is applied to the set of features to generate a treatment residual. The online system obtains a first likelihood the user will perform the desired action when the user is not presented with the content item from the control output and a second likelihood the user will perform the desired action when the user is presented with the content item from a combination of the control output and the treatment residual. The online system subsequently obtains the lift prediction as a difference between the first likelihood and the second likelihood.

In another embodiment, an architecture of the lift prediction model is configured as a neural network including a user portion and an item portion, the item portion including a first portion and a second portion, the first portion and the second portion sharing a subset of parameters. The online system obtains a first set of features describing a user and a second set of features describing an item associated with an online system. The online system accesses a machine-learned neural network model with a set of trained parameters, where the neural network model includes the user portion and the item portion. The online system generates a lift prediction for the item user and the content item by applying the neural network model, where the lift prediction indicates an increase in likelihood the user will perform a desired action on the item when presented with a content item relative to when the user is not presented with the content item. The online system may present the content item to the user for viewing if the lift prediction is equal to or above a threshold.

Specifically, to generate the lift prediction, the user portion of the neural network model is applied to the first set of features to generate a user embedding. The first portion of the item portion is applied to the second set of features to generate a control embedding, and the second portion of the item portion is applied to the second set of features to generate a treatment embedding. The online system obtains a first likelihood the user will perform the desired action when the user is not presented with the content item by combining the user embedding with the control embedding and obtains a second likelihood the user will perform the desired action when the user is presented with the content item by combining the control embedding and the treatment embedding with the user embedding. The online system obtains the lift prediction as a difference between the first likelihood and the second likelihood.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
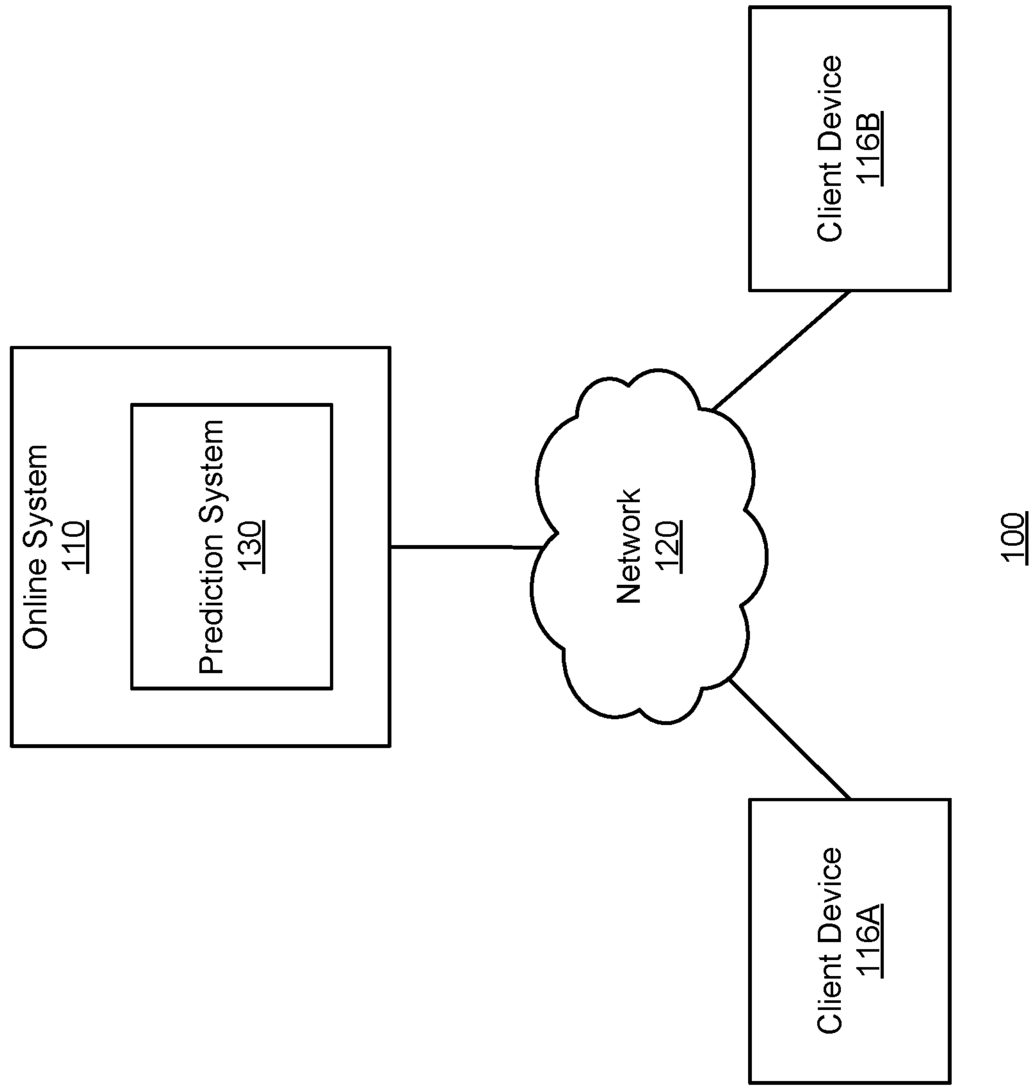
FIG. 1 illustrates a system environment of an online system, in accordance with one or more embodiments.

FIG. 1 illustrates a system environment of an online system 110, in accordance with one or more embodiments. The system environment 100 illustrated in FIG. 1 includes an online system 110 and one or more client devices 116A, 116B. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Additionally, the figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online system 110. The online system 110 is configured to receive orders from one or more users of client devices 116 (only two client devices are shown for the sake of simplicity). An order may specify a list of goods or products to be delivered to the user. The order may also specify the location to which the goods are to be delivered, and a time window during which the goods should be delivered. In some embodiments, the order may specify retailers from which the selected items should be purchased. The user may use a user mobile application (UMA) to place the order, where the UMA is configured to communicate with the online system 110.

The online system 110 is configured to transmit orders received from users of client devices 116 to one or more pickers who is a contractor, employee, or other person (or entity) who is enabled to fulfill the orders received by the online system 110. The orders may be made in association with one or more retailers that may be physical retailers, such as grocery stores, discount stores, department stores, or non-public warehouses storing items that can be collected and delivered to users. Each picker fulfills an order received from the online system 110 at one or more retailers, delivers the order to the user, or performs both fulfillment and delivery. In some embodiments, pickers make use of a picker mobile application which is configured to interact with the online system 110.

In one embodiment, the online system 110 includes an inventory database receives and maintains inventory information from various retailers. The inventory of each retailer may be unique and may change over time. The online system 110 may store inventory records in the inventory database that includes both qualitative and quantitative information about products, including size, color, weight, stock keeping unit (SKU), serial number, and the like that can be used to characterize and identify products. The online system 110 may also include a user database that stores and maintains user information. The user information may include account logins, user profile information such as age, gender, geographic location of users, and the like.

In one embodiment, the online system 110 synthesizes and displays an ordering interface to a user via the UMA on a respective client device 116, for example, through a browser application or a mobile application on the client device 116. The online system 110 may coordinate the ordering interface with the inventory database to determine which products are available at which retailers. The ordering interface may be configured, for example, to list available products for one or more retailers, list sale prices or promotional prices for each product, or receive query requests from users and display a list of relevant products matching the query. The ordering interface may receive orders from users and facilitates transactions associated with each order by, for example, generating a set of elements that the user can use to complete payments. Responsive to receiving an order and payment, the online system 110 may coordinate with the appropriate retailer and picker to fulfill the order.

In one embodiment, the online system 110 presents one or more content items to users interacting with the online system 110 through the ordering interface. In one instance, the content items are sponsored content items, such as advertisements, that promote one or more items associated with the online system 110. While examples in the remainder of the specification use a product as an example of an item for ease of explanation, it is appreciated that in other embodiments, an item may be an artifact of any type, and may correspond to a product, a video, an image, a blog post, and the like. The online system 110 may define a desired action a user can perform with respect to the item. A content item may be generated by a third-party content provider in conjunction with a retailer selling the product, a manufacturer of the product, a distributor of the product, and the like, or may be generated by any other party. The online system 110 may provide a content item to a user with an objective for the user to perform a desired action associated with the item promoted in the content item. In one instance, the desired action is a conversion in which the user purchases the product of the content item in response to viewing or otherwise interacting with the content item. Typically, a user presented with a content item may proceed through one or more stages of favorable interactions with the content item (e.g., click, share) leading up to a purchase.

Specifically, responsive to receiving a request from a client device 116, the online system 110 may select a content item for display to the user and present the selected content item to the user. In one embodiment, the online system 110 may present the content items to users anywhere on the ordering interface, for example, a sidebar of the ordering interface, a banner on a top portion of the ordering interface, or alongside search results in response to a search query by a user. However, the content item may be presented with some indication (e.g., labeled text, banner) that the content item is not a part of the search results. For example, an advertisement may be displayed adjacent to a list of search results generated in response to a search query "ground beef" with a red banner with text "sponsored." As another example, a video advertisement may be displayed adjacent to the list that plays while the user is browsing through the list of displayed products.

The online system 110 is configured to receive records of various actions associated with content items, including whether the user interacted (e.g., click) with the content item, whether the user purchased the item through the online system 110 or through an external website containing the item (e.g., conversion), and the like. The online system 110 may store these records in, for example, an event log, in association with particular users who performed the actions. Through these records, the online system 110 can determine various metrics for determining the performance of these content items such as click-through rate (i.e., number of clicks relative to number of impressions) or conversion rate (i.e., number of purchases relative to number of impressions) that are all indicative of how effective the content items are in achieving the desired goal.

One important metric is incremental lift. Specifically, lift evaluates the effectiveness of a given content item by measuring the increase in desired actions of users that are attributable to the content items. In other words, lift indicates the increase in likelihood that users will perform desired actions in response to being presented with content items relative to when the users would have been presented with the content items (but subsequently were not presented with the content items). In this manner, the online system 110 can evaluate the effectiveness of the content items as well as the platform on which the content items are presented.

It is advantageous to predict incremental lift for users and items in addition to predictions of other metrics. However, this is inherently a difficult problem because a user cannot be presented and not presented with a content item at the same time. If accurate lift predictions can be generated, the online system 110 can evaluate performance of content items more effectively and use the lift predictions to target users that are likely to be affected by presentation of content items relative to users that are not. However, conventional models for predicting lift have limited capacity to process large amounts of data. Moreover, conventional models for predicting lift involve generating a training dataset that divides a group of users into a treatment group and a control group such that only the treatment group is presented with a content item. Since the number of users in the control group are typically significantly different (e.g., smaller or larger) than the number of users in the treatment group, this can lead to inaccurate and biased results.

Thus, in one embodiment, the online system 110 includes a prediction system 130 that trains one or more machine-learned lift prediction models for predicting lift. A lift prediction model may be configured to receive a set of features describing a user and an item and generate a lift prediction that indicates an increase in likelihood the user will perform a desired action when presented with a content item promoting the item relative to when the user would have been but is not presented with such a content item.

In one instance, content items are presented to users based on the generated lift predictions. For example, responsive to receiving a request from a client device 116 of a user, the online system 110 may select a plurality of candidate content items for a particular user based on relevance between the items promoted in each candidate content item and the user. The relevance may be determined using a machine-learned model coupled to receive features for a user and an item. The online system 110 may generate lift predictions for each candidate content item using a machine-learned lift prediction model. The online system 110 may select a content item having the highest lift prediction for display to the user.

In one embodiment, the one or more lift prediction models are configured as neural networks. Specifically, by configuring the lift prediction model as a neural network, the lift prediction model can capture and process information from users and items in various formats and more flexibly model users and items compared to existing methods. In one embodiment, the lift prediction model includes at least a first portion for generating control predictions and a second portion for generating treatment predictions, where the first portion and the second portion share a subset of parameters. The shared subset of parameters can capture information important for generating both control and treatment predictions even when the training data for a control group of users might be significantly different (e.g., smaller or larger) than that of the treatment group. On the other hand, the unshared subset of parameters can be used to differentiate control predictions from treatment predictions that is important for determining the lift metric.

Figure 2:
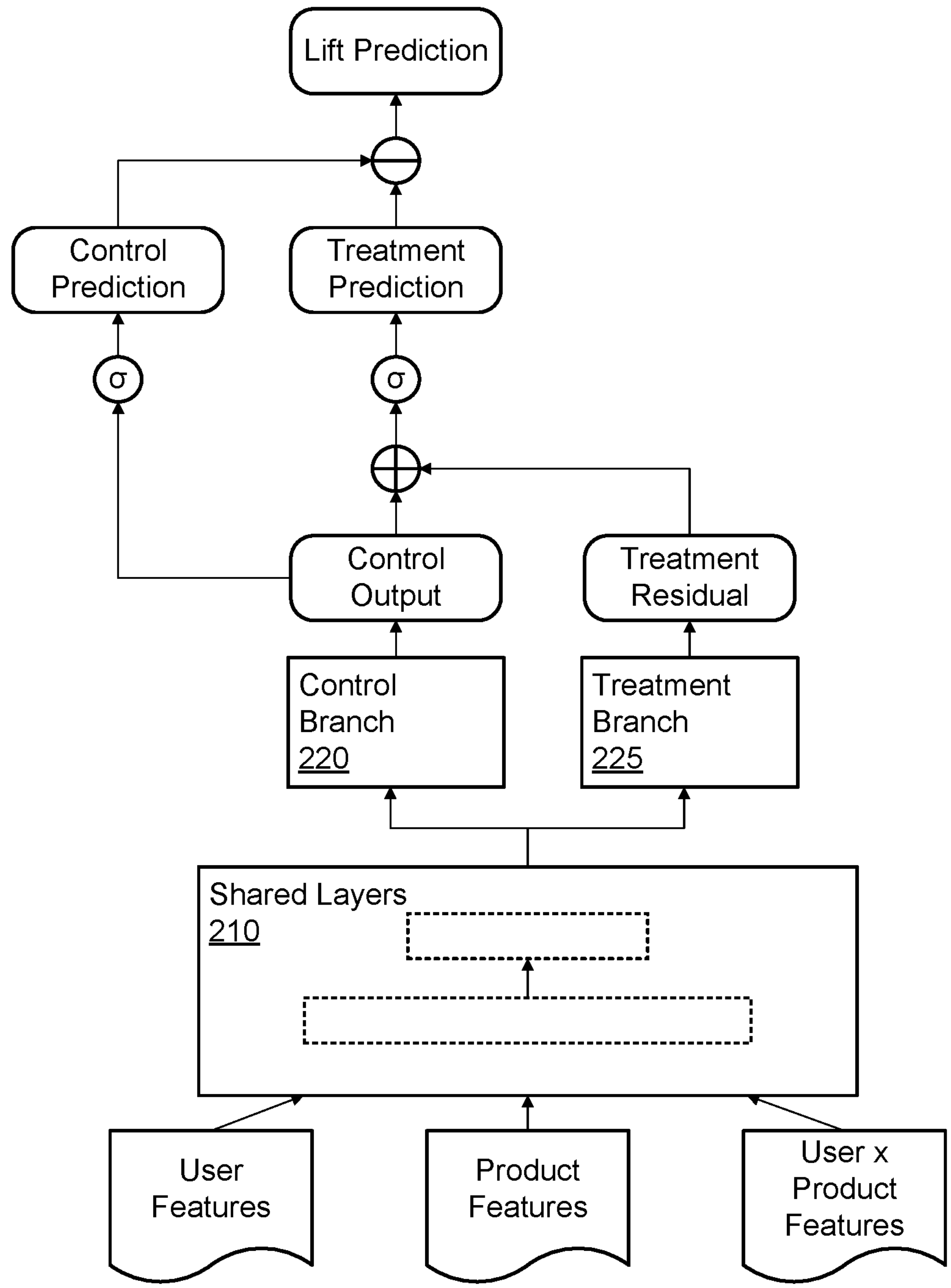
FIG. 2 illustrates an inference process of a machine-learned lift prediction model, in accordance with one or more embodiments.

FIG. 2 illustrates an inference process of a machine-learned lift prediction model 200, in accordance with one or more embodiments. Specifically, FIG. 2 illustrates a first embodiment of the lift prediction model 200 for which the parameters of the lift prediction model 200 have been determined already through a training process. The training process will be described in more detail in conjunction with FIG. 4.

In the first embodiment, an architecture of the lift prediction model 200 is configured as a neural network including a first portion and a second portion, the first portion and the second portion sharing a subset of parameters. In particular, the lift prediction model 200 shown in FIG. 2 includes one or more shared layers 210, a control branch 220 including one or more layers, and a treatment branch 225 including one or more layers. The first portion may be composed of the shared layers 210 and the control branch 220. The second portion may be composed of the shared layers 210 and the treatment branch 225. Thus, the first portion and the second portion share a subset of parameters that are the parameters of the shared layers 210. The parameters of the control branch 220 may not be shared with the parameters of the treatment branch 225. In other words, the control branch 220 may include one or more neural network layers and the treatment branch 225 may include one or more neural network layers. The nodes of the layers of the control branch 220 and nodes of the layers of the treatment branch 225 may not have edges (that are associated with the parameters) between each other.

During the inference process, the prediction system 130 obtains a set of features describing a user and an item associated with the online system 110. In the example shown in FIG. 2, the example of an item is a product. The set of features may include user features describing characteristics of the user (e.g., age, geographic location, user identifier), item features describing characteristics of the item (e.g., product type, retailer, distributor, product identifier), and user and item cross features (e.g., recent products purchased by the user, whether user previously purchased the product), and the like.

The prediction system 130 generates a lift prediction for the user and the content item by applying the lift prediction model 200, the lift prediction indicating an increase in likelihood the user will perform a desired action (e.g., conversion) on the item when presented with a content item relative to when the user would have been but is not presented with the content item. To generate the lift prediction, the first portion of the lift prediction model 200 is applied to the to the set of features to generate a control output. Specifically, the control output may be generated by applying parameters of the shared layers 210 to the set of features to generate an intermediate output and applying parameters of the control branch 220 to the intermediate output to generate the control output. A mapping function (e.g., activation function such as sigmoid function) is applied to the control output to generate a control prediction. The control prediction indicates a first likelihood the user will perform the desired action for the item when the user would have been but is not presented with a content item, for example, if the user satisfied some presentation criteria for a content item but was not presented with the content item.

The second portion of the lift prediction model 200 is applied to the set of features to generate a treatment residual. Specifically, the treatment residual may be generated by applying the parameters of the shared layers 210 to the set of features to generate the intermediate output and applying parameters of the treatment branch 225 to the intermediate output to generate the treatment residual. A mapping function (e.g., sigmoid function) is applied to the combination of the control output and the treatment residual to generate a treatment prediction. The treatment prediction indicates a second likelihood the user will perform the desired action when the user is presented with the content item. The prediction system 130 obtains the lift prediction as a difference between the first likelihood and the second likelihood.

While the inference process is described with respect to applying a first portion and a second portion of the lift prediction model, it is appreciated that in practice, the control output and the treatment residual may be generated by applying the parameters of the shared layers 210 that are common to both the first portion and the second portion of the lift prediction model to generate the intermediate output. Subsequently, the control branch 220 is applied to the intermediate output to generate the control output and separately, the treatment branch 225 is applied to the intermediate output to generate the treatment residual.

Figure 3:
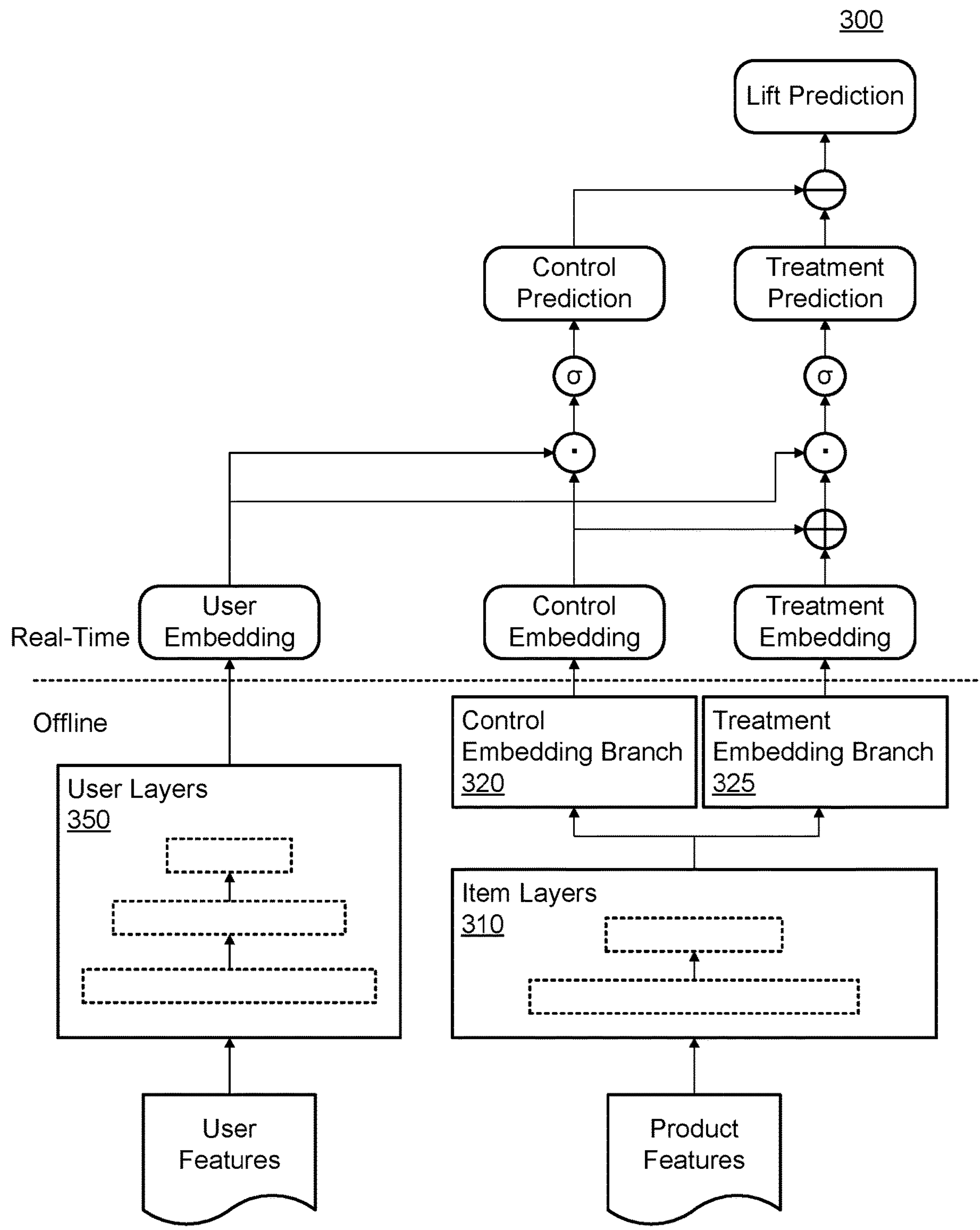
FIG. 3 illustrates an inference process of a machine-learned lift prediction model, in accordance with one or more additional embodiments.

FIG. 3 illustrates an inference process of a machine-learned lift prediction model, in accordance with one or more additional embodiments. Specifically, FIG. 3 illustrates a second embodiment of the lift prediction model 300 for which the parameters of the lift prediction model 300 have been determined already through a training process. Different from the lift prediction model shown in FIG. 2, the lift prediction model 300 shown in FIG. 3 maps a user to a user embedding. The lift prediction model 300 also maps an item to both a control embedding and a treatment embedding that can each be combined with the user embedding to generate control and treatment predictions for the user and the item. The training process will be described in more detail in conjunction with FIG. 5.

In the second embodiment, an architecture of the lift prediction model is configured as a neural network including a user portion and an item portion, the item portion including a first portion and a second portion, the first portion and the second portion sharing a subset of parameters. In particular, the lift prediction model 300 shown in FIG. 3 includes one or more user layers 350, one or more item layers 310, a control embedding branch 320, and a treatment embedding branch 325. The first portion may be composed of the item layers 310 and the control embedding branch 320. The second portion may be composed of the item layers 310 and the treatment embedding branch 325. Thus, the first portion and the second portion of the item portion share a subset of parameters that are parameters of the item layers 310. The parameters of the control embedding branch 320 may not be shared with the parameters of the treatment embedding branch 325. In other words, the control embedding branch 320 may include one or more neural network layers and the treatment embedding branch 325 may include one or more neural network layers. The nodes of the layers of the control embedding branch 320 and nodes of the layers of the treatment embedding branch 325 may not have edges (that are associated with the parameters) between each other.

During the inference process, the prediction system 130 obtains a first set of features describing a user and a second set of features describing an item associated with an online system 110. In the example shown in FIG. 3, an example item is a product. The first and second sets of features may be similar to those described in conjunction with FIG. 2.

The online system generates a lift prediction for the user and the content item by applying the lift prediction model 300, the lift prediction indicating an increase in likelihood the user will perform a desired action on the item when presented with a content item relative to when the user would have been but is not presented with the content item. To generate the lift prediction, the user portion of the lift prediction model 300 is applied to the first set of features to generate a user embedding. Specifically, the user embedding may be generated by applying parameters of the user layers 350 to the first set of features. The user embedding represents the user as a vector in a latent space with a set of dimensions.

The first portion of the item portion is applied to the second set of features to generate a control embedding. Specifically, the control embedding may be generated by applying parameters of the item layers 310 to the second set of features to generate an intermediate output and applying parameters of the control embedding branch 320 to the intermediate output to generate the control embedding. The prediction system 130 combines the user embedding with the control embedding and applies a mapping function to the combined value to generate a control prediction. The control prediction indicates a first likelihood the user will perform the desired action when the user is not presented with the content item.

The second portion of the item portion is applied to the second set of features to generate a treatment embedding. Specifically, the treatment embedding may be generated by applying parameters of the item layers 310 to the second set of features to generate the intermediate output and applying parameters of the treatment embedding branch 325 to the intermediate output to generate the treatment embedding. The prediction system 130 combines the user embedding with the combination of the control embedding and the treatment embedding and applies a mapping function to the combined value to generate a treatment prediction. The treatment prediction indicates a second likelihood the user will perform the desired action when the user is presented with the content item. The prediction system 130 obtains the lift prediction as a difference between the first likelihood and the second likelihood.

While the inference process is described with respect to applying a first portion and a second portion of the item portion of the lift prediction model, it is appreciated that in practice, the control embedding and the treatment embedding may be generated by applying the parameters of the item layers 310 that are common to both the first portion and the second portion of the item portion to generate the intermediate output. Subsequently, the control embedding branch 320 is applied to the intermediate output to generate the control embedding and separately, the treatment embedding branch 325 is applied to the intermediate output to generate the treatment embedding.

Typically, the online system 110 presents a content item responsive to receiving a request from a client device 116 of a user (e.g., when the user performs a search query on the ordering interface). Thus, the online system 110 may be required to identify candidate content items and select a content item for presentation within a very short amount of time (e.g., milliseconds). The prediction system 130 may deploy the machine-learned prediction model to generate lift predictions for users and items as requests from client devices 116 are received such that, for example, content items with a threshold level of lift predictions are selected for presentation.

In one embodiment, the prediction system 130 may generate the user embeddings, control embeddings, and treatment embeddings beforehand ("offline") and store the embeddings in an embedding database. For example, the prediction system 130 may have access to the inventory database and user database of the online system 110 and may obtain features for users and items from these databases. The prediction system 130 applies the user layers 350 to the first set of features to generate user embeddings for existing users. The prediction system 130 applies the item layers 310, control embedding branch 320, and treatment embedding branch 325 of the lift prediction model 300 to generate control embeddings and treatment embeddings for existing items.

As requests are received from client devices 116, the prediction system 130 may generate lift predictions for a user and an item by retrieving the respective user embedding for the user and the respective control embedding and treatment embedding for the item, and combining the embeddings as described in conjunction with FIG. 3. When deploying the lift prediction model to service real-time requests, there may be a bottleneck in generating the embeddings since neural networks often have a significant number of layers and it is computationally intensive to propagate inputs through the layers to generate outputs. Moreover, the online system 110 may at one time, manage a significant number of users and products (e.g., millions of users and products), and it may be difficult to quickly generate the embeddings for the many users and products. By using previously-generated embeddings beforehand, the prediction system 130 can generate lift predictions by retrieving the appropriate embeddings from the database which requires very little time compared to propagating through the layers of the neural network, and thus, may service requests faster and more effectively.

Returning to the system environment 100 of FIG. 1, the client devices 116A, 116B are mobile phones, tablets, laptops, or desktop computers that users can use to access the online system 110. In particular, responsive to a request from a user (e.g., accessing a website through a web browser), the client device 116 may access a UMA of the online system 110 through an application running on the client device 116 or through a website accessed in a browser application. The UMA includes an ordering interface, which provides an interactive interface with which a user can browse through and select products and place an order. For example, the ordering interface may display a list of products and the amounts and prices of products that a user has selected to order. The user may review the selected products list and place an order based on the selected products list. As another example, the ordering interface may allow a user to search for products offered for sale on the online system 110. For example, the ordering interface may include elements that the user may use to enter a search query. Once the user enters a search query, the ordering interface may present to the user a set of search results that are received from the online system 110.

The ordering interface on a client device 116 may also present content items to users that the online system 110 selects for presentation to the user. In one embodiment, a content item selected for presentation to a user of a client device 116 may be one that promotes one or more items in which a lift prediction for the user and the item is equal to or above a predetermined threshold. The content items may be presented anywhere on the ordering interface including, but not limited to, a top portion or side portion of the ordering interface or alongside a list of products displayed on the ordering interface, and the like. Responsive to an impression, the user of the client device 116 may further interact with the content item by clicking on the content item to obtain additional information on the item from another page, share the content item with other users of the online system 110, or convert on the content item by purchasing the item promoted in the content item through the online system 110. The client device 116 may be configured to obtain records of these different actions of the user and provide the records to the online system 110 in association with the particular user.

The network 120 provides a communication infrastructure between the online system 110 (including the prediction system 130) and the client devices 116A, 116B. The network 120 is typically the Internet, but may be any network, including but not limited to a Local Area Network (LAN), a Metropolitan Area Network (MAN), a Wide Area Network (WAN), a mobile wired or wireless network, a private network, or a virtual private network.

Block Diagram of Online System

Figure 4:
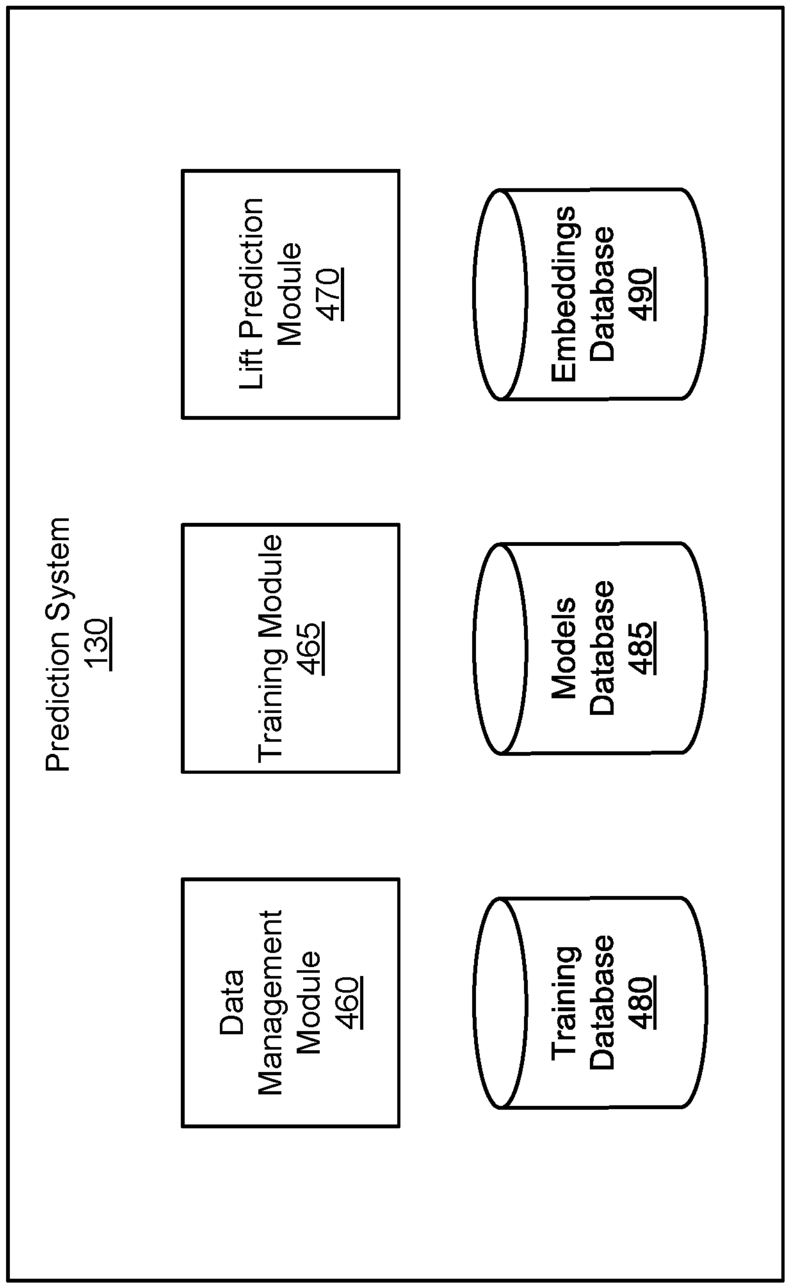
FIG. 4 is a block diagram illustrating an architecture of the online system, in accordance with one or more embodiments.

FIG. 4 is a block diagram of a prediction system 130, according to some embodiments. The prediction system 130 illustrated in FIG. 4 includes a data management module 460, a training module 465, and a lift prediction module 470. Additionally, the prediction system 130 may include a training database 480, a models database 485, and an embeddings database 490. Alternative embodiments may include more, fewer, or different components from those illustrated in FIG. 4, and the functionality of each component may be divided between the components differently from the description below. Additionally, each component may perform their respective functionalities in response to a request from a human, or automatically without human intervention.

The data management module 460 obtains training data for training one or more lift prediction models and manages the training data in the training database 480. The training database 480 stores training data for training both the lift prediction model 200 of FIG. 2 and the lift prediction model 300 of FIG. 3. The training data includes a plurality of training instances that each include a previous instance on whether a user was presented with a content item promoting an item and whether the user performed a desired action on the item.

A training instance includes a set of features. In one instance, the set of features include a first set of user features. Specifically, the first set of user features may include characteristics of users including account logins, user profile information such as age, gender, geographic location of users, and the like. The data management module 460 may obtain and extract the first set of user features from a user database maintained by the online system 110. In one instance, the set of features include a second set of item features. Specifically, the second set of item features may include characteristics of items including size, color, weight, stock keeping unit (SKU), serial number, and the like that can be used to characterize and identify items. The data management module 460 may obtain and extract the second set of item features from an inventory database maintained by the online system 110. In one instance, the set of features include a third set of user and item cross features. Specifically, the third set of user and item cross features may include characteristics pertaining to the respective user's interactions with the respective item of the training instance including whether the user has ordered the product before (and if so, how recently), whether the item is related to other items the user has ordered, or the relevance of the item to a search query provided by the user.

A training instance includes a label indicating whether a user performed a desired action with respect to an item associated with the training instance. In one instance, the desired action encoded by the label is whether the user purchased a product when the item is a product. For example, the label for a training instance for a particular shampoo product may indicate whether the user purchased the shampoo product through the online system 110 (e.g., through the ordering interface) or whether the user accessed an external website or application (e.g., web site of retailer of shampoo product) to purchase the shampoo product. The data management module 460 may obtain and extract the label from the records received by the online system 110 from client devices 116 as users of the client devices 116 interact with and perform actions in response to the presentation (or no presentation) of content items. In one instance, the label is encoded as a one (or other non-zero value) if the user performed the desired action and as a zero if the user did not perform the desired action for the item.

A training instance also includes a treatment identifier indicating whether a user was presented ("impression") with a content item promoting the item associated with the training instance. For example, the treatment identifier for a training instance for the particular shampoo product may indicate whether the user was presented with a content item promoting the shampoo product. In one instance, the treatment identifier is encoded as a one (or other non-zero value) if the user was presented with a content item and as a zero if the user was not presented with a content item. In one instance, the treatment identifier is zero if the user would have been presented with a content item (e.g., because the user satisfied some presentation criteria), but was not presented with the content item.

In one embodiment, the data management module 460 may continuously update the training data stored in the training database 480 as the online system 110 provides content items for presentation to users and records the actions of the users in response to the presentation (or no presentation) of the content items. For example, as described in more detail below, the online system 110 may select and display content items for which lift predictions are equal to or above a predetermined threshold using the machine-learned lift prediction models. Alternatively, if the lift predictions for certain content items are less than the predetermined threshold, the online system 110 may not select and display these content items. The online system 110 may receive records of whether the users performed the desired action when presented (or not presented) with certain content items. The data management module 460 may obtain updated training data from these records and store the updated training data in the training database 480.

The training module 465 trains parameters of one or more lift prediction models using the training data stored in the training database 480. In one embodiment, the training module 465 trains parameters of a lift prediction model by repeatedly iterating between a forward pass step and a backpropagation step. Specifically, the training module 465 selects a subset of training instances from the training datastore 480. During the forward pass step, the set of features in the subset of training instances are propagated through the lift prediction model to generate estimated likelihoods of performing the desired action. The training module 465 determines a loss function that indicates a difference between the labels of the subset of training instances and the estimated likelihoods. During the backpropagation step, the parameters of the lift prediction model are updated based on error terms obtained from the loss function. This process is repeated for the next subset of training instances until a convergence criterion for the parameters are reached.

Figure 5:
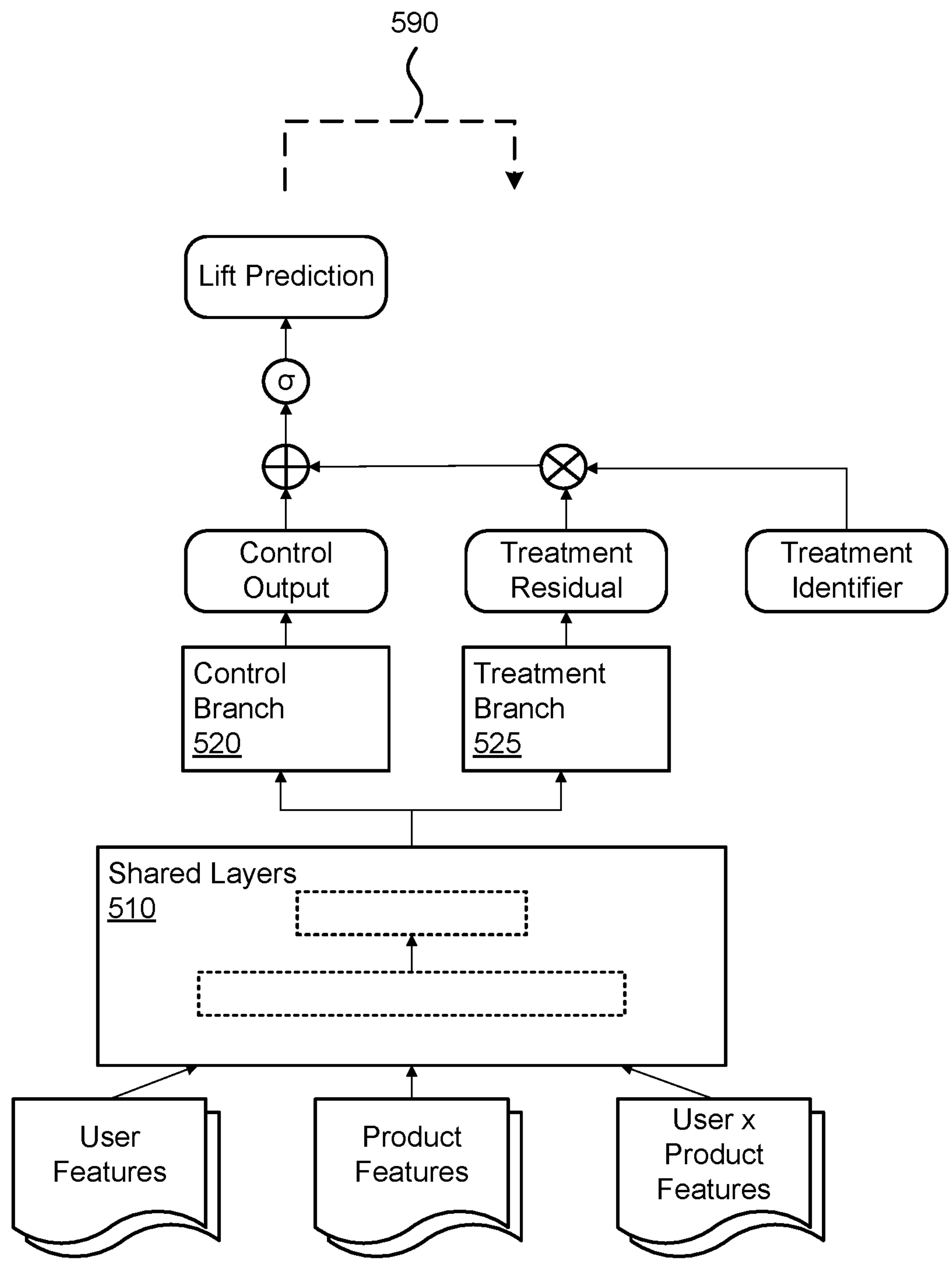
FIG. 5 is a training process of the lift prediction model illustrated in FIG. 2, in accordance with one or more embodiments.

FIG. 5 is a training process of the lift prediction model illustrated in FIG. 2, in accordance with one or more embodiments. Specifically, the lift prediction model 500 shown in FIG. 5 may be different from the lift prediction model 200 shown in FIG. 2 in that the parameters of the model have not yet been trained. Specifically, the training module 460 repeatedly performs one or more iterations to determine the parameters of the lift prediction model 500.

For an iteration of the training process, the training module 465 obtains a subset of training instances. For a training instance in the subset, the performs a forward pass step to generate an estimated likelihood. In particular, responsive to the treatment identifier for the training instance indicating that the content item was not presented to the respective user, the training module 465 applies the first portion of the lift prediction model 500 to the set of features for the training instance to generate an estimated control output. As described in conjunction with FIG. 2, the training module 465 may apply the shared layers 510 to generate an intermediate output, and apply the control branch 520 to the intermediate output to generate the estimated control output. The training module 465 applies a mapping function to the control output to generate the estimated likelihood.

On the other hand, responsive to the treatment identifier for the training instance indicating that the content item was presented to the user, the training module 465 applies the first portion of the lift prediction model 500 to the set of features to generate the estimated control output and the second portion of the lift prediction model 500 to the set of features to generate an estimated treatment residual. The training module 465 may apply the shared layers 510 to generate an intermediate output, apply the control branch 520 to the intermediate output to generate the estimated control output and applying the treatment branch 525 to the intermediate output to generate the estimated treatment residual. The training module 465 applies a mapping function to the combination of the estimated control output and the estimated treatment residual to generate the estimated likelihood.

The training module 465 determines a loss function 590 that indicates a difference between the estimated likelihoods and the labels for the subset of training instances. In one instance, the difference can be encoded by a L1-norm, L2-norm, L-infinity norm or any appropriate function. The training module 465 updates parameters of the lift prediction model 500 by backpropagating error terms obtained from the loss function 590. Thus, when the value of the treatment identifier for a training instance indicates that the respective user had been treated with a content item, the parameters of the treatment branch 525 are updated along with the parameters of the shared layers 510 and the control branch 520. When the value of the treatment identifier indicates that the respective user had not been treated with a content item, the parameters of only the shared layers 510 and the control branch 520 are updated.

The forward pass step and the backpropagation step may be repeated for the next iteration until a convergence criterion is reached. For example, the convergence criterion might be triggered when a difference between the parameters of a current iteration and the parameters of a previous iteration are below a threshold.

Figure 6:
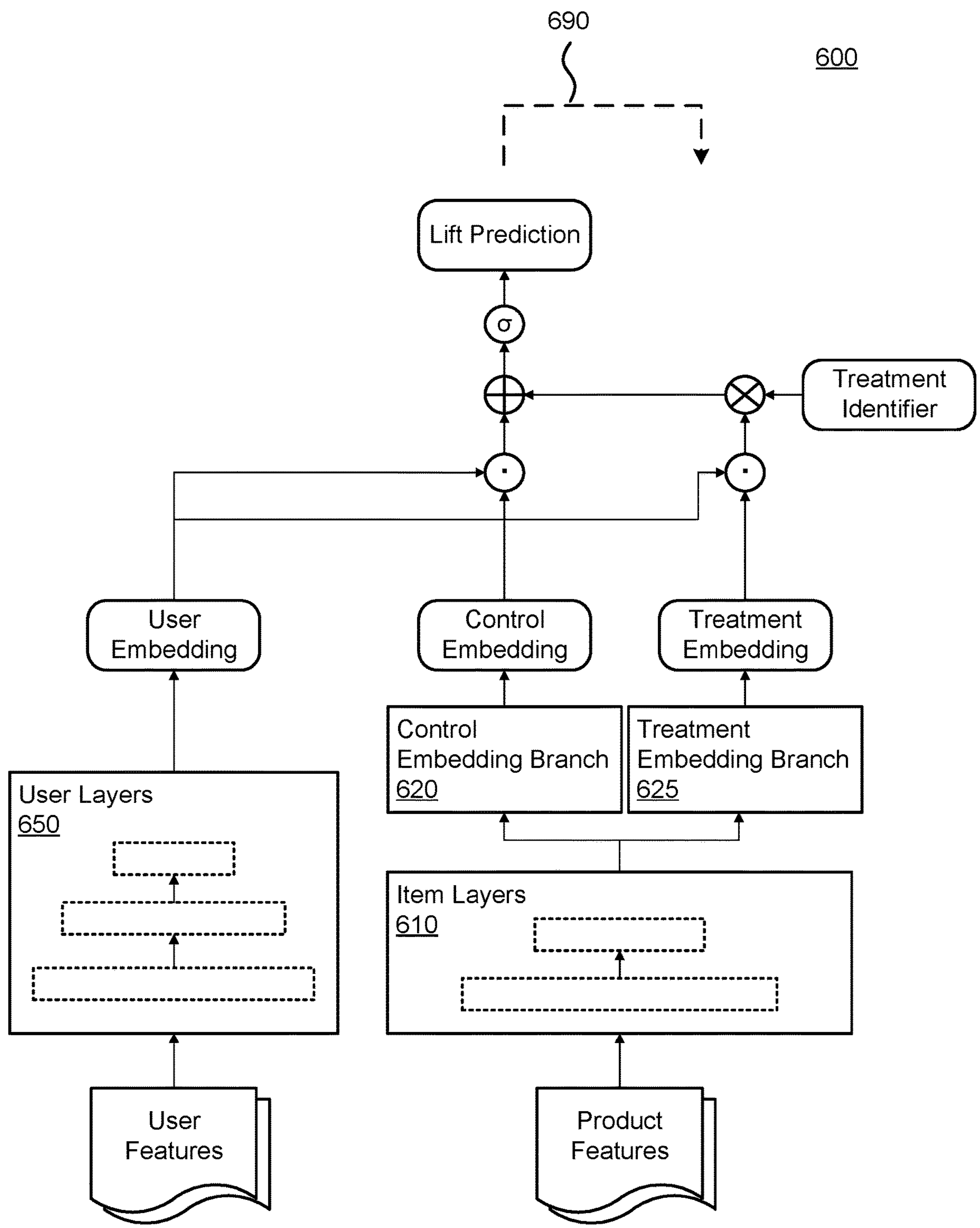
FIG. 6 is a training process of the lift prediction model illustrated in FIG. 3, in accordance with one or more embodiments.

FIG. 6 is a training process of the lift prediction model illustrated in FIG. 3, in accordance with one or more embodiments. Specifically, the lift prediction model 600 shown in FIG. 6 may be different from the lift prediction model 300 shown in FIG. 3 in that the parameters of the model have not yet been trained. The training module 465 repeatedly performs one or more iterations to determine the parameters of the lift prediction model 600.

For an iteration of the training process, the training module 465 obtains a subset of training instances. For a training instance in the subset, the performs a forward pass step to generate an estimated likelihood. The training module 465 applies the user portion to the first set of user features to generate an estimated user embedding. In addition, responsive to the treatment identifier for the training instance indicating that the content item was not presented to the respective user, the training module 465 applies the first portion of the item portion of the lift prediction model 600 to the second set of item features for the training instance to generate an estimated control embedding. Specifically, the training module 465 may applying the item layers 610 to the second set of item features to generate an intermediate output and apply the control embedding branch 620 to the intermediate output to generate the estimated control embedding. The training module 465 combines the estimated user embedding and the estimated control embedding to generate a combined output. In one instance, the estimated user embedding and the estimated control embedding have same dimensionality and the combination is a dot product between the two embeddings. The training module 465 applies a mapping function to the combined output to generate the estimated likelihood.

On the other hand, responsive to the treatment identifier for the training instance indicating that the content item was presented to the user, the training module 465 applies the first portion of the item portion of the lift prediction model 600 to the second set of item features to generate the estimated control embedding and the second portion of the item portion of the lift prediction model 600 to the second set of item features to generate an estimated treatment embedding. Specifically, the training module 465 may applying the item layers 610 to the second set of item features to generate an intermediate output, and apply the control embedding branch 620 to the intermediate output to generate the estimated control embedding and apply the treatment embedding branch 625 to the intermediate output to generate the estimated treatment embedding. The training module 465 combines the estimated control embedding and the estimated treatment embedding (e.g., sum). The training module 465 combines the user embedding and the summed embedding to generate a combined output. In one instance, the estimated user embedding, the estimated control embedding, and the estimated treatment embedding have same dimensionality and the combination is a dot product. The training module 465 applies a mapping function to the combined output to generate the estimated likelihood.

The training module 465 determines a loss function 690 that indicates a difference between the estimated likelihoods and the labels for the subset of training instances. In one instance, the difference can be encoded by a L1-norm, L2-norm, L-infinity norm or any appropriate function. The training module 465 updates parameters of the lift prediction model 600 by backpropagating error terms obtained from the loss function 690. Thus, when the value of the treatment identifier for a training instance indicates that the respective user had been treated with a content item, the parameters of the treatment embedding branch 625 are updated along with the parameters of the item layers 610 and the control embedding branch 620. When the value of the treatment identifier indicates that the respective user had not been treated with a content item, the parameters of only the item layers 610 and the control embedding branch 620 are updated.

The forward pass step and the backpropagation step may be repeated for the next iteration until a convergence criterion is reached. For example, the convergence criterion might be triggered when a difference between the parameters of a current iteration and the parameters of a previous iteration are below a threshold.

Returning to FIG. 4, the training module 465 may store the trained lift prediction models in the models database 485 such that the models can be used to serve requests for content items. In one embodiment, the training module 465 may also periodically or continuously monitor the training database 480 for new training data. Responsive to determining that there is new training data, the training module 465 may periodically perform a training process to update the parameters of the lift prediction models to reflect the new training data.

The lift prediction module 470 receives requests to generate lift predictions for users and content items from, for example, other modules of the online system 110. The requests may be received in response to a request received by the online system 110 from one or more client devices 116 to provide content items for display. Specifically, a request may include one or more users and content items that each promote one or more items (e.g., products, videos, images, blog posts). The lift prediction module 470 performs an inference process using the machine-learned lift prediction models stored in the models database 485 to generate the lift predictions.

In particular, given a user and a content item promoting a respective item, the lift prediction module 470 may obtain a set of features for the user and the item. When the first embodiment of the lift prediction model (described in FIGS. 2 and 5) is used, the set of features may include a first set of user features, a second set of item features, and a third set of user and item cross features. The lift prediction module 470 may apply the first embodiment of the lift prediction model to the set of features to generate the lift prediction as described in conjunction with FIG. 2. When the second embodiment of the lift prediction model (described in FIGS. 3 and 6) is used, the set of features may include a first set of user features and a second set of item features. The lift prediction module 470 may apply the second embodiment of the lift prediction model to the set of features to generate the lift prediction as described in conjunction with FIG. 3. The lift predictions may be provided back to the module of the online system 110 that initiated the requests, such that the online system 110 may provide content items for display to a user based on the generated lift predictions. In one instance, the content items that are associated with lift predictions equal to or above a predetermined threshold are presented to users. Alternatively, the content items that are associated with lift predictions less than a predetermined threshold are not presented to users. However, this is one example, and it is appreciated that the generated lift predictions can be used in any way to select content items for presentation to users. For example, the lift predictions can be fed into other models or downstream tasks as an input feature. For example, the lift predictions can be fed into another model that predicts likelihoods of users performing desired actions on content items as an important input feature.

As described with respect to the second embodiment of the lift prediction model, in one embodiment, the lift prediction module 470 may generate the user embeddings, control embeddings, and treatment embeddings beforehand ("offline") and store the embeddings in the embedding database 490. As requests are received real-time to service requests from client devices 116, the lift prediction module 470 may generate lift predictions for a user and an item by retrieving the respective user embedding for the user and the respective control embedding and treatment embedding for the item from the embeddings database 490, and combining the embeddings as described in conjunction with FIG. 3.

Flowchart of Inference Process and Training Process of Lift Prediction Model

In the example flowcharts shown in FIGS. 7 through 10, modules and databases of the prediction system 130 or the online system 110 may perform the illustrated steps. However, some or all of the steps may be performed by other entities or components. In addition, some embodiments may perform the steps in parallel, perform the steps in different orders, or perform different steps.

Figure 7:
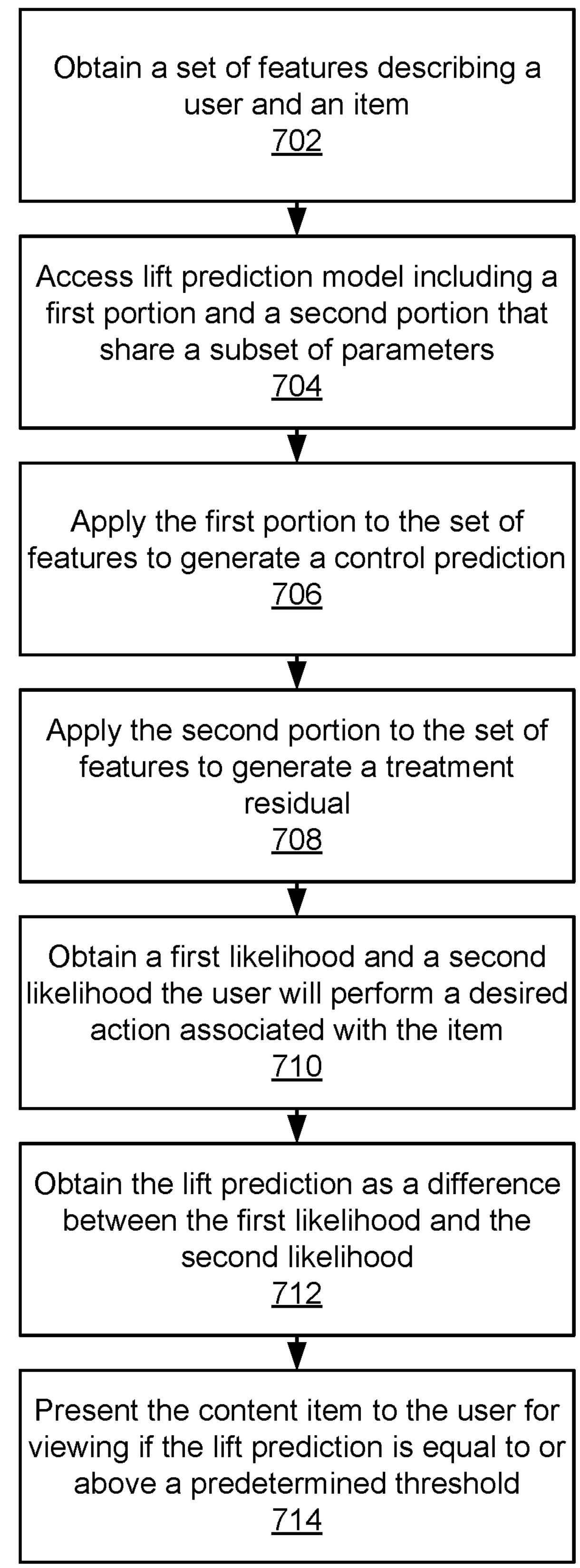
FIG. 7 is a flowchart illustrating a method of generating lift predictions using a machine-learned lift prediction model, in accordance with one or more embodiments.

FIG. 7 is a flowchart illustrating a method of generating lift predictions using a first embodiment of the machine-learned lift prediction model, in accordance with one or more embodiments. The prediction system 130 obtains 702 a set of features describing a user and an item associated with an online system 110. The prediction system 130 accesses 704 a machine-learned lift prediction model configured as a neural network with a set of trained parameters. The lift prediction model includes a first portion and a second portion, the first portion and the second portion sharing a subset of parameters.

The prediction system 130 generates a lift prediction for the user and the content item by applying the lift prediction model. The lift prediction indicates an increase in likelihood the user will perform a desired action on the item when presented with a content item relative to when the user is not presented with the content item. Specifically, the prediction system 130 applies 706 the first portion of the lift prediction model to the set of features to generate a control prediction. The prediction system 130 applies 708 the second portion of the lift prediction model to the set of features to generate a treatment residual.

The prediction system 130 obtains 710 a first likelihood the user will perform the desired action when the user is not presented with the content item from the control prediction and a second likelihood the user will perform the desired action when the user is presented with the content item from a combination of the control prediction and the treatment residual. The prediction system 130 obtains the lift prediction as a difference between the first likelihood and the second likelihood. The online system 110 may present the content item to the user for viewing if the lift prediction is equal to or above a predetermined threshold. Alternatively, if the lift prediction is less than the predetermined threshold, the online system 110 may not present the content item to the user for viewing.

Figure 8:
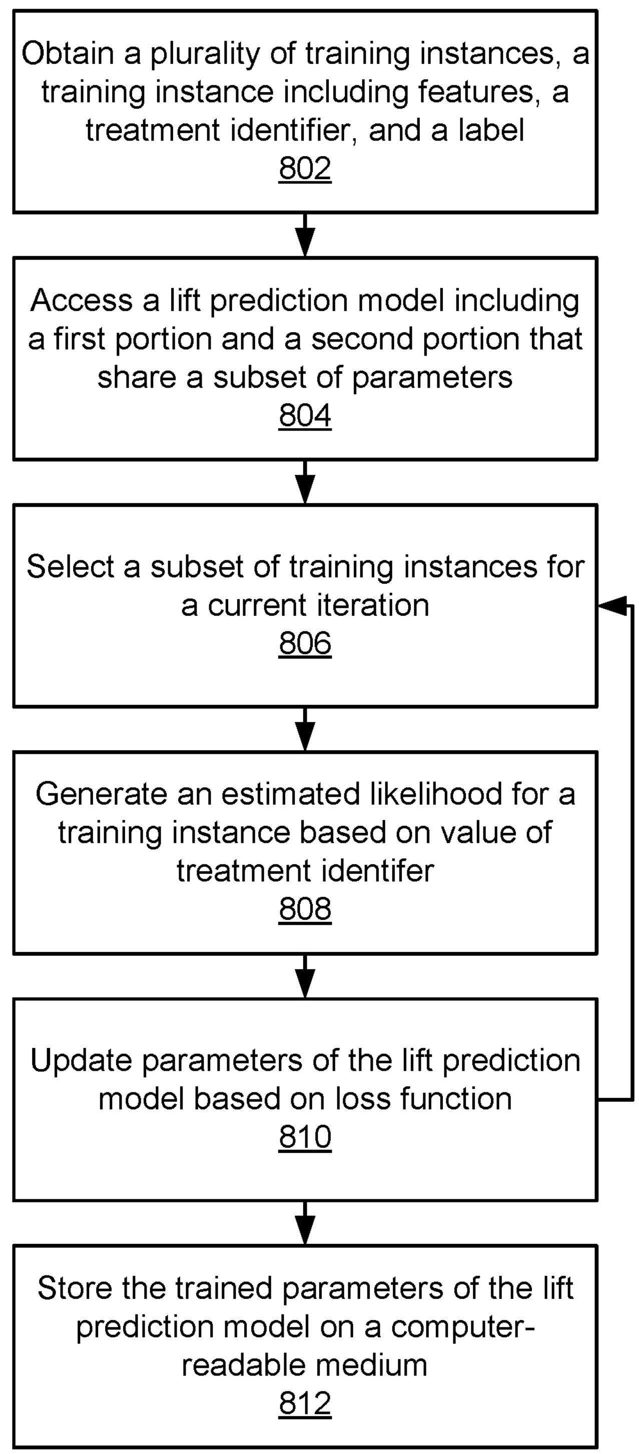
FIG. 8 is a flowchart illustrating a method of training a lift prediction model, in accordance with one or more embodiments.

FIG. 8 is a flowchart illustrating a method of training the first embodiment of the lift prediction model, in accordance with one or more embodiments. The prediction system 130 obtains 802 a plurality of training instances. A training instance may include a set of features describing a respective user and an item associated with an online system, a treatment identifier indicating whether the user was presented with a content item of the item, and a label indicating whether the user performed a desired action for the item. The prediction system 130 accesses 804 a lift prediction model with an initial set of parameters. The lift prediction model includes a first portion and a second portion, the first portion and the second portion sharing a subset of parameters.

The prediction system 130 repeatedly performs, for one or more iterations, a forward pass step and a backpropagation step. Specifically, the prediction system 130 selects 806 a subset of the plurality of training instances for the iteration. In one instance, the training instances are enumerated and for each iteration, a subset of training instances may be selected according to the enumerated sequence. For each training instance in the selected subset, the prediction system 130 generates 808 an estimated likelihood for the training instance. In particular, responsive to the treatment identifier for the training instance indicating that the content item was not presented to the respective user, the prediction system 130 generates the estimated likelihood by applying the first portion to the set of features for the training instance to generate a control output. Responsive to the treatment identifier for the training instance indicating that the content item was presented to the user, the prediction system 130 generates the estimated likelihood by applying the first portion and the second portion to the set of features for the training instance to generate a control output and a treatment residual and combining the control output and the treatment residual.

The prediction system 130 updates 810 the parameters of the lift prediction model based on a loss function that indicates a difference between the labels and the estimated likelihoods for the subset of training instances. The prediction system 130 stores 812 the trained parameters of the lift prediction model on a computer-readable medium.

Figure 9:
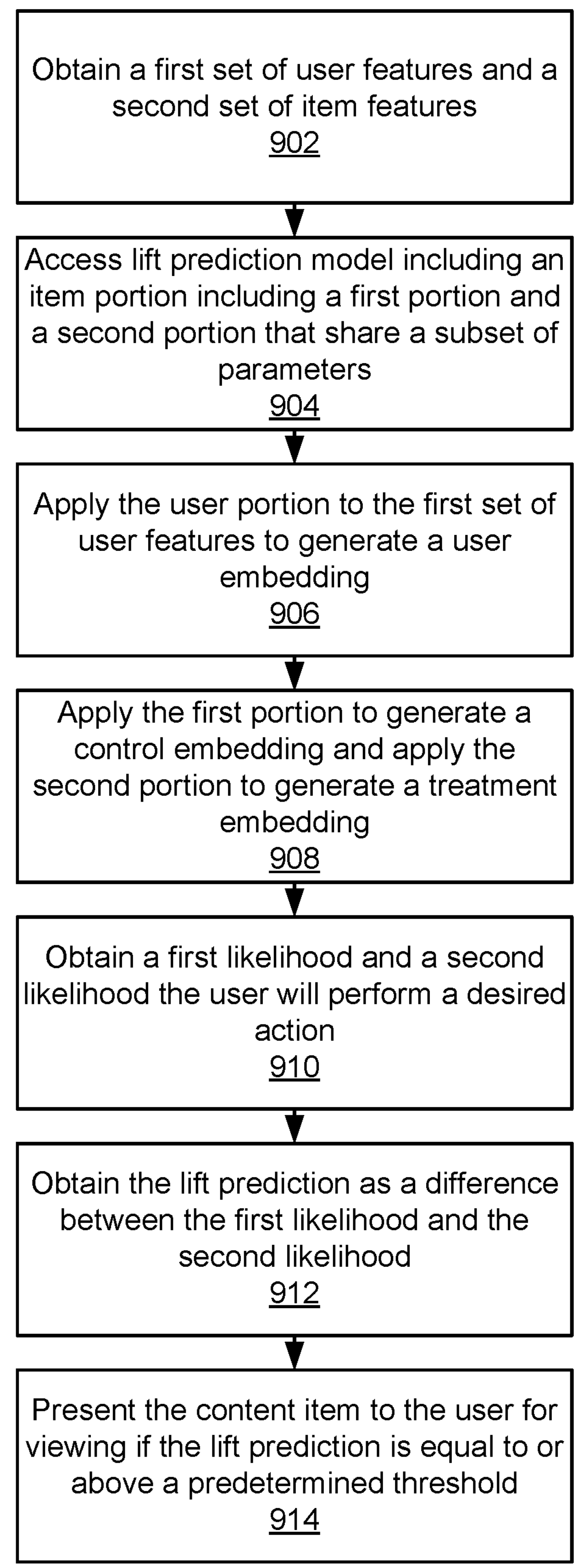
FIG. 9 is a flowchart illustrating a method of generating lift predictions using a machine-learned lift prediction model, in accordance with one or more additional embodiments.

FIG. 9 is a flowchart illustrating a method of generating lift predictions using a machine-learned lift prediction model, in accordance with one or more additional embodiments. The prediction system 130 obtains 902 a first set of features describing a user and a second set of features describing an item associated with an online system 110. The prediction system 130 accesses 904 a machine-learned lift prediction model with a set of trained parameters. The lift prediction model includes a user portion and an item portion, the item portion including a first portion and a second portion, the first portion and the second portion sharing a subset of parameters.

The prediction system 130 generates a lift prediction for the item user and the content item by applying the lift prediction model. The lift prediction indicates an increase in likelihood the user will perform a desired action on the item when presented with a content item relative to when the user is not presented with the content item. Specifically, the prediction system 130 applies 906 the user portion of the lift prediction model to the first set of features to generate a user embedding. The prediction system 130 applies 908 the first portion of the item portion to the second set of features to generate a control embedding and applies the second portion of the item portion to the second set of features to generate a treatment embedding.

The prediction system 130 obtains 910 a first likelihood the user will perform the desired action when the user is not presented with the content item by combining the user embedding with the control embedding and obtaining a second likelihood the user will perform the desired action when the user is presented with the content item by combining the control embedding and the treatment embedding with the user embedding. The prediction system obtains 912 the lift prediction as a difference between the first likelihood and the second likelihood. The online system 110 presents 914 the content item to the user for viewing if the lift prediction is equal to or above a predetermined threshold.

Figure 10:
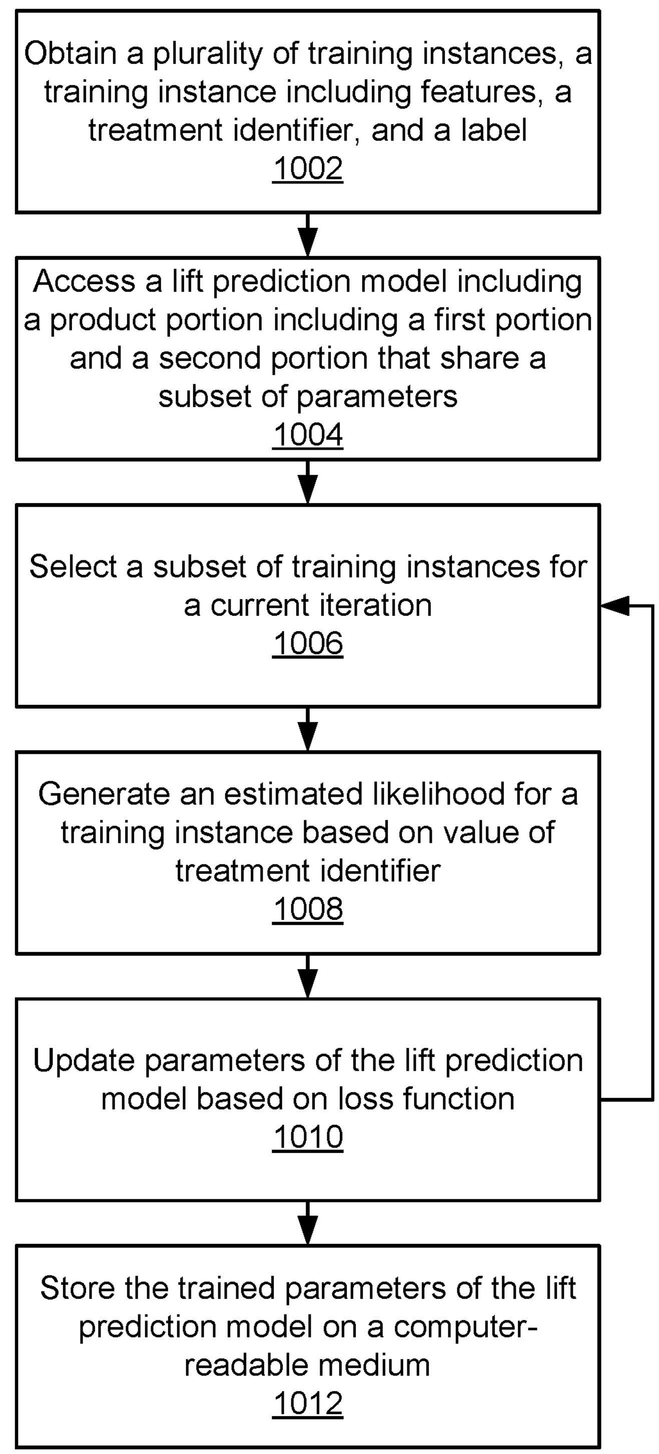
FIG. 10 is a flowchart illustrating a method of training a lift prediction model, in accordance with one or more additional embodiments.

FIG. 10 is a flowchart illustrating a method of training a lift prediction model, in accordance with one or more additional embodiments. The prediction system 130 obtains 1002 a plurality of training instances. A training instance may include a set of features describing a respective user and a respective item associated with an online system, a treatment identifier indicating whether the user was presented with a content item of the item, and a label indicating whether the user performed a desired action for the item. The prediction system 130 accesses 1004 a lift prediction model with an initial set of parameters. The lift prediction model includes a user portion and an item portion, the item portion including a first portion and a second portion, the first portion and the second portion sharing a subset of parameters.

The prediction system 130 repeatedly performs, for one or more iterations, a forward pass step and a backpropagation step. Specifically, the prediction system 130 selects 1006 a subset of the plurality of training instances for the iteration. In one instance, the training instances are enumerated and for each iteration, a subset of training instances may be selected according to the enumerated sequence. For each training instance, the prediction system 130 generates 1008 an estimated likelihood for the training instance. Specifically, the predict system 130 applies the user portion to the first set of features for the training instance to generate a user embedding. Responsive to the treatment identifier for the training instance indicating that the content item was not presented to the respective user, the prediction system 130 applies the first portion to the second set of features for the training instance to generate a control embedding. The prediction system 130 generates the estimated likelihood by combining the control embedding with the user embedding. Responsive to the treatment identifier for the training instance indicating that the content item was presented to the user, the prediction system 130 applies the first portion and the second portion to the second set of features for the training instance to generate a control embedding and a treatment embedding. The prediction system 130 generates the estimated likelihood by combining the control embedding and the treatment embedding with the user embedding.

The prediction system updates 1010 the parameters of the lift prediction model based on a loss function that indicates a difference between the labels and the estimated likelihoods for the subset of training instances. The prediction system stores 1012 the trained parameters of the lift prediction model on a computer-readable medium.

Other Considerations

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. A computer-readable medium referred to herein may include one or more media that together store instructions. Additionally, the computers referred to herein may include a single processor or may be architectures employing multiple processor designs.

The algorithms and operations presented herein are not inherently related to any particular computer or other apparatus. Various systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

It should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

What is claimed is:

1. A method, comprising: at a computer system comprising at least one processor and memory: obtaining a set of features describing a user and an item associated with an online system; accessing a machine-learned neural network model with a set of trained parameters, the neural network model including a first portion and a second portion, the first portion and the second portion sharing a subset of parameters; generating a lift prediction for the user and a content item promoting the item by using the neural network model, the lift prediction indicating an increase in likelihood that the user will perform a desired action on the item when presented with a content item relative to when the user is not presented with the content item, the generating comprising: applying the first portion of the neural network model to the set of features to generate a control output; applying the second portion of the neural network model to the set of features to generate a treatment residual; and obtaining a first likelihood that the user will perform the desired action when the user is not presented with the content item from the control output and a second likelihood that the user will perform the desired action when the user Is presented with the content item from a combination of the control output and the treatment residual; obtaining the lift prediction as a difference between the first likelihood and the second likelihood; determining prediction is equal to or above a predetermined threshold and presenting the content item to the user wherein the neural network model includes one or more shared layers, a control branch coupled to the shared layers, and a treatment branch coupled to the shared layers, wherein the first portion includes the shared layers and the control branch, wherein the second portion includes the shared layers and the treatment branch, and wherein the shared subset of parameters are parameters of the shared layers.

2. The method of claim 1, wherein each of the control branch and the treatment branch are configured as neural network layers, and wherein parameters of the control branch are separate from parameters of the treatment branch.

3. The method of claim 1, wherein applying the first portion and the second portion of the neural network model comprises:

applying the parameters of the one or more shared layers to the set of features to generate an intermediate output; applying parameters of the control branch to the intermediate output to generate the control output; and applying parameters of the treatment branch to the intermediate output to generate the treatment residual.

4. The method of claim 1, wherein the desired action is the user making a purchase of the item.

5. The method of claim 1, wherein the first likelihood is obtained by applying a sigmoid function to the control output, and wherein the second likelihood is obtained by applying a sigmoid function to the combination of the control output and the treatment residual.

6. The method of claim 1, wherein the set of features includes a first set of features characterizing the user, a second set of features characterizing the item, and a third set of cross features that describe the user's association with the item.

7. The method of claim 6, wherein the first set of features include at least one or a combination of age of the user, geographic location associated with the user, or account information of the user, wherein the item is a product, and wherein the second set of features include at least one or a combination of a size of the product, color of the product, weight of the product, stock keeping unit (SKU) of the product, or serial number of the product.

8. The method of claim 6, wherein the third set of cross features include whether the user previously purchased the item.

9. The method of claim 1, further comprising:

responsive to receiving a request for a content item, obtaining a plurality of candidate content items for the user, the plurality of candidate content items including the content item;

generating lift predictions for the plurality of candidate content items using the lift prediction model; and responsive to determining that the lift prediction for the content item is equal to or above the predetermined threshold, presenting the content item to a client device of the user.

10. The method of claim 1, further comprising not presenting the content item to the user for viewing if the lift prediction is less than the predetermined threshold.

11. A method comprising: at a computer system comprising at least one processor and memory: obtaining a plurality of training instances, a training instance including a set of features describing a respective user and an item associated with an online system, a treatment identifier indicating whether the user was presented with a content item of the item, and a label indicating whether the user performed a desired action for the item; accessing a neural network model with an initial set of parameters, the neural network model including a first portion and a second portion, the first portion and the second portion sharing a subset of parameters; repeatedly performing, for one or more iterations: selecting a subset of the plurality of training instances for the iteration; for each training instance in the selected subset, generating an estimated likelihood for the training instance, comprising: responsive to the treatment identifier for the training instance indicating that the content item was not presented to the respective user, applying the first portion to the set of features for the training instance to generate a control output, and obtaining the estimated likelihood from the control output; responsive to the treatment identifier for the training instance indicating that the content item was presented to the user, applying the first portion and the second portion to the set of features for the training instance to generate a control output and a treatment residual, and obtaining the estimated likelihood from a combination of the control output and the treatment residual; and updating the parameters of the neural network model based on a loss function that indicates a difference between the labels and the estimated likelihoods for the subset of training instances; and storing the trained parameters of the neural network model on a computer-readable medium, wherein the neural network model includes one or more shared layers, a control branch coupled to the shared layers, and a treatment branch coupled to the shared layers, wherein the first portion includes the shared layers and the control branch, wherein the second portion includes the shared layers and the treatment branch, wherein the shared subset of parameters are parameters of the shared layers and wherein the user making a purchase of the item and wherein the user making a purchase.

12. The method of claim 11, wherein each of the control branch and the treatment branch are configured as neural network layers, and wherein parameters of the control branch are separate from parameters of the treatment branch.

13. The method of claim 11, wherein applying the first portion and the second portion of the neural network model comprises:

applying the parameters of the one or more shared layers to the set of features to generate an intermediate output; and applying parameters of the treatment branch to the intermediate output to generate the treatment residual.

14. The method of claim 11, wherein the estimated likelihood is obtained by applying a sigmoid function to the control output when the treatment identifier indicates the content item was not presented to the respective user, and wherein the estimated likelihood is obtained by applying the sigmoid function to the combination of the control output and the treatment residual when the treatment identifier indicates the content item was presented to the respective user.

15. The method of claim 11, wherein the set of features for the training instance includes a first set of features characterizing the respective user, a second set of features characterizing the respective item, and a third set of cross features that describe the user's association with the item.

16. The method of claim 15, wherein the first set of features include at least one or a combination of age of the user, geographic location associated with the user, or account information of the user, wherein the item is a product, and wherein the second set of features include at least one or a combination of a size of the product, color of the product, weight of the product, stock keeping unit (SKU) of the product, or serial number of the product.

17. The method of claim 15, wherein the third set of cross features include whether the user previously purchased the item.

* * * * *